United States Patent Office 3,471,792
Patented Oct. 7, 1969

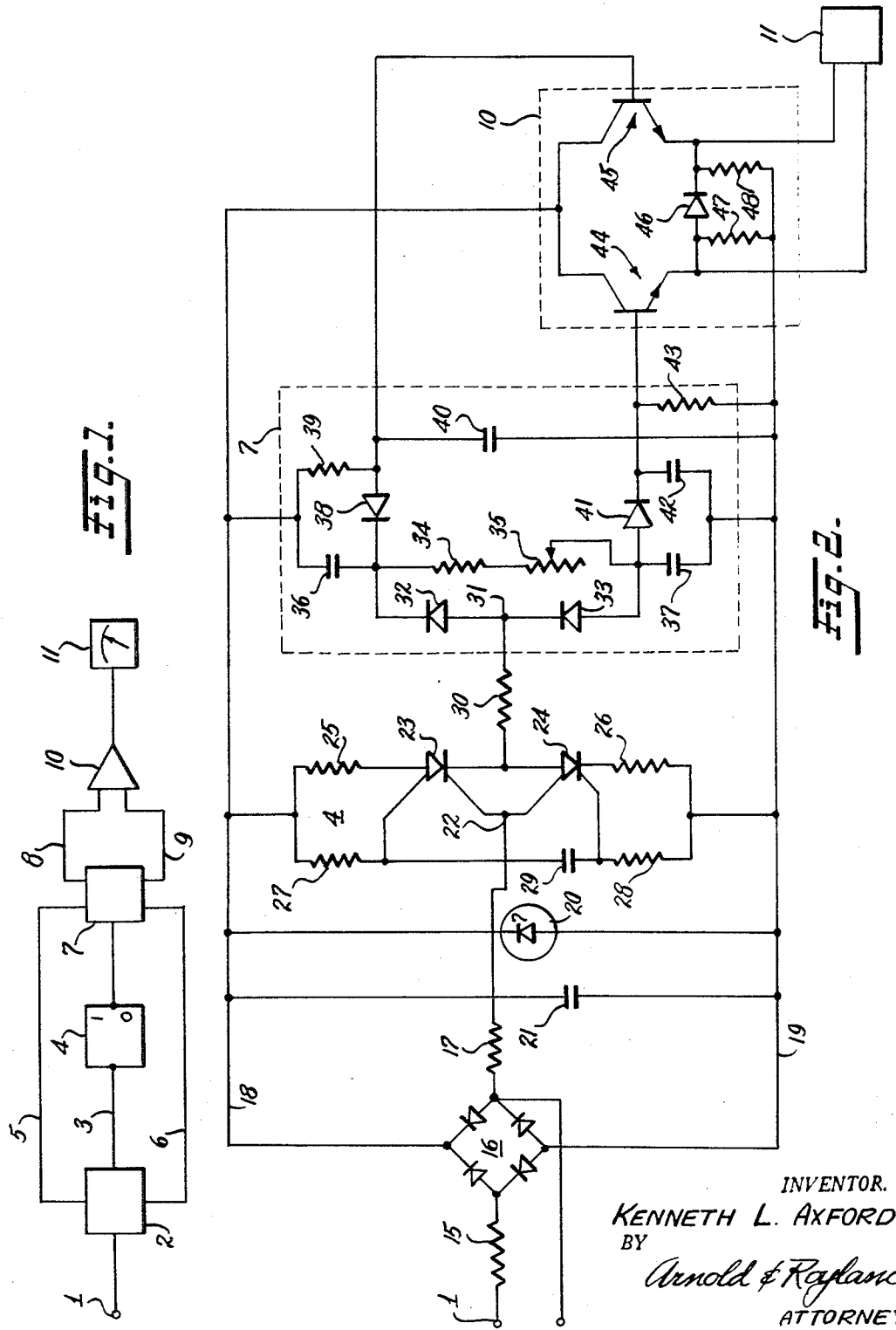

3,471,792
AC FREQUENCY TO DC TRANSDUCER
Kenneth L. Axford, Warrenton, Va., assignor to Weston Instruments, Inc., Newark, N.J., a corporation of Delaware
Filed Aug. 30, 1966, Ser. No. 576,026
Int. Cl. H03d 1/18
U.S. Cl. 329—192     6 Claims This invention relates to apparatus for providing a direct current output signal the magnitude of which varies in accordance with the frequency of an alternating current input signal. The invention is particularly useful for giving an indication when the frequency of an AC input signal deviates from a preselected value.

Systems for providing a direct current output dependent upon the frequency of an alternating current input have been developed which employ saturable magnetic devices of various types. Systems employing saturable magnetic devices are inherently subject to several disadvantages, one being an unduly high power consumption from the signal source due to the need to drive the core well into saturation to obtain good voltage regulation and frequency sensitivity. Long stabilization times generally result from the high power consumption because of the temperature gradients established within the transducer. Also, waveshapes and regulation are frequently poor because the core saturation characteristics are not adequately sharp. Further, incorporation of a saturable core increases the weight of the unit, the unit can easily be damaged by application of an input signal at a frequency below the design frequency range, and only a relatively small range of output voltages is available.

Systems of this general type not using saturable cores have heretofore been unsatisfactory because of low output voltages, poor regulation or extreme complexity.

Briefly described, the invention disclosed herein includes an output circuit to which the AC input signal is applied and which couples the signal to a bistable circuit. The bistable circuit modifies the input signal in waveform but does not change the signal frequency, the rectangular waveform output of the bistable circuit being then delivered to a frequency detection circuit which generates two DC voltage levels as functions of frequency, the voltages differing only when the frequency of the input signal deviates from a preselected frequency. A circuit is also provided to establish two reference voltage levels with which the two variable DC levels are compared. The variable DC levels are applied to the inputs of a differential amplifier which drives a utilization device, an output appearing from the differential amplifier only when the frequency of the input signal differs from the preselected frequency.

A general object of this invention is to provide apparatus for generating a DC output signal which varies in magnitude in correspondence with variations in the frequency of an AC input signal.

Another object is to provide apparatus for generating a DC output signal which varies in magnitude in correspondence with deviations of the frequency of an AC input signal from a predetermined frequency.

Yet another object is to provide an apparatus in which an AC input signal is supplied to a bistable circuit and then to a frequency detecting circuit which drives a differential amplifier, the latter having an output if the frequency of the input signal deviates from a predetermined frequency.

In order that the manner in which the foregoing and other objects are attained in accordance with the invention can be understood in detail, one particularly advantageous embodiment thereof will be described with reference to the accompanying drawings, which form a part of this specification and wherein:

FIG. 1 is a schematic diagram in block form of a system incorporating the present invention; and FIG. 2 is a schematic diagram showing the system of FIG. 1 in greater detail.

FIG. 1 shows a block diagram of the system to be described in detail in which an alternating current input signal is applied to an input terminal 1 which is connected to the input terminal of an input circuit 2 which lowers the input AC voltage to a preselected level and couples that signal, via a conductor 3, to the input terminal of a bistable circuit 4. Input circuit 2 also produces, from the AC input signal voltage, a DC voltage which establishes a first reference potential level on a conductor 5 and a second reference potential level on a conductor 6, these conductors being connected to a frequency detector circuit 7.

The output of bistable circuit 4 is an alternating current signal at the same frequency as the signal applied to terminal 1 and is applied to an input terminal of frequency detector circuit 7. Circuit 7 is designed, as will be described in greater detail below, to generate first and second DC voltages which are connected, through conductors 8 and 9, to the input terminals of a differential amplifier circuit 10. The output of amplifier circuit 10 is connected to the input of a utilization circuit 11 shown diagrammatically as a meter.

The system is shown in greater detail in FIG. 2, wherein input terminal 1 is connected to one terminal of a voltage dropping resistor 15, the other terminal of which is connected to one AC terminal of a conventional diode bridge circuit 16, the other AC terminal of which is connected to a coupling resistor 17. The positive and negative DC terminals of bridge 16 are connected respectively to a positive conductor 18 and a negative conductor 19 which provide positive and negative DC reference levels for the remainder of the system. The potential difference between conductors 18 and 19 is held constant by the action of a Zener diode 20 connected between conductors 18 and 19 and by the filtering action of a capacitor 21 connected in parallel with diode 20.

The other terminal of resistor 17 is connected to an input terminal 22 of a bistable network including silicon controlled switches 23 and 24. Switches 23 and 24 are a recently developed form of controlled rectifier, each switch having an anode electrode, a cathode electrode, a cathode gate electrode and an anode gate electrode. These switches are somewhat more sensitive than controlled rectifiers and can be turned on and off, i.e., rendered conductive and nonconductive, by appropriate voltages applied to their gate electrodes. A more complete discussion of silicon controlled switches can be found in the General Electric Company Transistor Manual, seventh edition (1964), beginnning at page 391. The anode-cathode circuits of switches 23 and 24 are connected in series circuit relationship with each other and with resistors 25 and 26 between conductors 18 and 19. A commutating circuit including resistors 27 and 28 and a capacitor 29, all connected in series circuit relationship, is connected in parallel circuit relationship with the silicon controlled switch circuit between conductors 18 and 19, the capacitor being between the two resistors. The cathode gate electrode of switch 24 is connected to the junction of resistor 28 and capacitor 29, and the anode gate electrode of switch 23 is connected to the junction of resistor 27 and capacitor 29. The anode gate electrode of switch 24 and the cathode gate electrode of switch 23 are both connected to input terminal 22 of the bistable circuit.

The output of the bistable circuit is taken from the junction betwee switches 23 and 24, this junction being connected by a resistor 30 to a junction 31 which constitutes the input terminal for the frequency detector circuit 7. Junction 31 is connected to the anode of a semiconductor diode 32 and to the cathode of a semiconductor diode 33, diodes 32 and 33 being connected in series circuit relationship and in parallel with a resistive charging circuit including a fixed resistor 34 and a variable resistor 35. A capacitor 36 is connected between conductor 18 and one end of the resistive charging circuit, and a capacitor 37 is connected between the other end of the resistive charging circuit and conductor 19. The cathode of a semiconductor diode 38 is connected to the junction of capacitor 36 and resistor 34, the anode of diode 38 being connected to the junction of a resistor 39 and a capacitor 40, resistor 39 and capacitor 40 forming a series circuit between conductors 18 and 19. The anode of a semiconductor diode 41 is connected to the junction of capacitor 37 and variable resistor 35, the cathode of diode 41 being connected to one end of a capacitor 42 and a resistor 43. The other terminals of capacitor 42 and resistor 43 are connected to conductor 19.

The cathode of diode 41 is connected to the base electrode of an NPN transistor indicated generally at 44. The anode of diode 38 is also connected to the base electrode of an NPN transistor indicated generally at 45. Transistors 44 and 45 are the active elements of differential amplifier 10. The collector electrodes of transistors 40 and 45 are connected to each other and to conductor 18. The anode of a semiconductor diode 46 is connected to the emitter electrode of transistor 44, the cathode of diode 46 being connected to the emitter electrode of transistor 45. The emitter electrodes of transistors 44 and 45 are coupled, by resistors 47 and 48, to conductor 19, and are also connected to a utilization device 11 which can be a meter or other indicating or controlling device.

In operation, the AC input signal is coupled through resistor 17 to input terminal 22 of the bistable circuit and is connected to the cathode gate of switch 23 and to the anode gate of switch 24. On the positive half cycle, switch 23 is rendered conductive, providing charging current through the circuit including resistor 25, switch 23, resistor 30, diode 32 and resistors 34 and 35 to charge capacitor 37.

While capacitor 37 is being charged, diode 41 allows capacitor 42 to also develop a charge equal to that on capacitor 37, but prevents capacitor 42 from discharging with capacitor 37. Thus a voltage is developed across capacitor 42 which pulsates but remains substantially constant. Because of the relatively low impedance of the charging path up to the cathode of diode 38, the junction at the cathode of that diode becomes substantially equal to the voltage at the conductor 18 and there is essentially no charge on capacitor 36.

During the negative half cycle of the AC signal at terminal 22, switch 24 is rendered conductive, providing a current charging path through resistor 26, switch 24, resistor 30, diode 33 and resistors 35 and 34 to charge capacitor 36. While capacitor 36 is being charged, diode 38 allows capacitor 40 to accumulate a charge to the same potential level as that on capacitor 36, but discharge is prevented in the same manner as by diode 41. It should further be noted that, although the voltage at the terminal of capacitor 40 connected to the anode of diode 38 follows the voltage at that terminal of capacitor 36 which is connected to the cathode of diode 38, the voltage across capacitor 40 is not necessarily equal to the voltage across capacitor 36. This is true because the other terminals of those capacitors are connected to different reference potential levels. Thus the voltage across capacitor 40 will be equal to the voltage between conductors 18 and 19 minus the voltage across capacitor 36, during the period in which capacitor 36 is being charged.

Also, while capacitor 36 is being charged, capacitor 37 is discharged through diode 33. As will be recognized by one skilled in the art, during one-half of each cycle one of capacitors 36 and 37 will be charged to a level determined by the value of the capacitor and of the charging circuit, primarily the resistance of resistors 34 and 35. While one capacitor is being charged, the voltage across the other capacitor is reduced to substantially the level of its adjacent conductor, i.e., the voltage at the cathode of diode 38 is brought to the level of conductor 18 while the voltage at the end of diode 41 is brought to the level of conductor 19.

It will be seen that the charge accumulated on either capacitors 36 and 37 is a function of time and therefore a function of the frequency of the input signal. It will also be apparent that with proper selection of the values of capacitors 36 and 37 and resistors 34 and 35, a voltage can be developed across either capacitor, at a preselected frequency which is exactly one-half of the potential difference between conductors 18 and 19. This level can be adjusted by adjustment of variable resistor 35. At this frequency the charge accumulated across capacitor 37 and transferred to capacitor 42 is precisely equal to the charge accumulated across capacitor 36 and transferred to capacitor 40. Thus, the voltages applied to the base electrodes of transistors 44 and 45 are identical, and no output results from differential amplifier 10.

However, if the frequency of the input signal is increased above the value for which variable resistance 35 is adjusted, the capacitors 36 and 37 will have a shorter time in which to accumulate a charge. Thus, if the reference potential difference between conductors 18 and 19 is 40 volts, capacitor 37 will have an opportunity to charge only to, for example, 18 volts, while capacitor 36, since its reference level is conductor 18, will charge to only 22 volts. The charge on capacitor 36 increases "away from" the potential at conductor 18, this charge beginning at 40 volts and, as the charge increases, the voltage at the cathode of diode 38 will decrease in absolute magnitude. Under these circumstances, the voltage transferred to capacitor 42 is 18 volts, while the voltage transferred to capacitor 40 is 22 volts. Thus, the difference in potential applied between the base electrodes of transistors 44 and 45 is 4 volts and a significant output is delivered to utilization device 11. It will be recognized that substantial sensitivity is obtained because of the additive effect obtained by charging these reference capacitors from two different potential levels and through the same charging circuit and by then transferring these charges to capacitors operating from the same reference level.

What is claimed is:

1. Apparatus comprising the combination of input circuit means having a signal input terminal to which an AC input signal can be supplied; bistable circuit means having an input terminal and an output terminal for producing a rectangular waveform output signal at said output terminal in response to an AC signal applied to said input terminal; first circuit means interconnecting said input circuit means and said bistable circuit means for applying said AC input signal to said bistable circuit means; second circuit means for providing at first and second reference terminals first and second voltage reference levels bearing a fixed relationship to each other; frequency detector circuit means having an input terminal connected to said output terminal of said bistable circuit means and having first and second output terminals, and first and second reference terminals connected to said first and second reference terminals of said second circuit means for providing a voltage at said first output terminal different from the voltage at said second output terminal only when the frequency of said AC input signal differs from a preselected frequency; differential amplifier circuit means having a first input terminal connected to said first output terminal of said detector circuit means, a second input terminal connected to said second output terminal of said detector circuit means, and an output terminal; and utilization circuit means connected to said output terminal of said differential amplifier circuit means.

2. An apparatus according to claim 1 wherein said input circuit means comprises a bridge rectifier circuit having four asymmetrically conductive legs and four vertices, two of said vertices being AC terminals and two being DC terminals, said two DC terminals being connected to said second circuit means, and said AC terminals being connected to said signal input terminal and said first circuit means, respectively.

3. An apparatus according to claim 2 wherein said second circuit means comprises a breakdown diode of the Zener type connected between said two DC terminals of said bridge rectifier circuit.

4. An apparatus according to claim 1 wherein said bistable circuit means comprises two asymmetrically conductive semiconductor switching devices each having an anode, a cathode, and at least one gate electrode, each said device having a conductive state and a nonconductive state, the anode-cathode circuits of said switching devices being connected in series circuit relationship between said first and second voltage reference terminals of said second circuit means, one gate electrode of each switching device being connected to said first circuit means; and commutating circuit means connected to said switching devices for rendering each said switching device conductive when the other said switching device is nonconductive.

5. An apparatus according to claim 1 wherein said frequency detector circuit means comprises a first capacitor having one terminal connected to said first terminal of said second circuit means at which said first voltage reference level appears; a second capacitor having one terminal connected to said second terminal of said second circuit means at which said second voltage reference level appears; a resistive charging circuit connected between the other terminals of said first and second capacitors; and first and second semiconductor diode means interconnecting the ends of said resistive charging circuit and said input terminal of said frequency detector circuit means for alternately charging said first and second capacitors through said resistive charging circuit.

6. An apparatus according to claim 5 wherein said frequency detector circuit means further comprises third and fourth capacitors, one terminal of each capacitor being connected to one of said first and second output terminals of said frequency detector circuit means; and diode circuit means for transferring the charge accumulated on said first capacitor to said third capacitor, and for transferring the charge accumulated on said second capacitor to said fourth capacitor.

References Cited

UNITED STATES PATENTS

| 3,044,020 | 7/1962 | Russell | 329—103 |
| 3,387,222 | 6/1968 | Hellwarth et al. | 329—192 |

ALFRED L. BRODY, Primary Examiner

U.S. Cl. X.R.

307—233, 284; 324—79; 325—344, 349; 329—103, 110, 111, 119, 204; 330—30